US008841795B2

(12) United States Patent
Kaneda et al.

(10) Patent No.: US 8,841,795 B2
(45) Date of Patent: Sep. 23, 2014

(54) ON-VEHICLE GENERATOR PROVIDED WITH OVERVOLTAGE DETECTING CIRCUIT

(75) Inventors: Yoshimasa Kaneda, Toyohashi (JP); Tomoya Okamoto, Kariya (JP)

(73) Assignee: Denso Corporation, Kariya (JP)

( * ) Notice: Subject to any disclaimer, the term of this patent is extended or adjusted under 35 U.S.C. 154(b) by 356 days.

(21) Appl. No.: 13/449,982

(22) Filed: Apr. 18, 2012

(65) Prior Publication Data

US 2012/0261983 A1 Oct. 18, 2012

(30) Foreign Application Priority Data

Apr. 18, 2011 (JP) ................................. 2011-092172

(51) Int. Cl.
*B60L 1/00* (2006.01)
*H02P 9/10* (2006.01)
(52) U.S. Cl.
CPC ...................................... *H02P 9/10* (2013.01)
USPC ........................................................ 307/9.1
(58) Field of Classification Search
USPC ................................................. 307/9.1, 10.1
See application file for complete search history.

(56) References Cited

U.S. PATENT DOCUMENTS

| 5,748,463 | A | 5/1998 | Tsutsui et al. |
| 6,353,307 | B1 | 3/2002 | Koelle et al. |
| 2005/0046397 | A1* | 3/2005 | Peter ............................. 322/44 |

FOREIGN PATENT DOCUMENTS

| JP | Y2-63-25869 | | 7/1988 |
| JP | A-6-269200 | | 9/1994 |
| JP | 08-023700 | A | 1/1996 |
| JP | A-9-219938 | | 8/1997 |
| JP | 2002-153094 | A | 5/2002 |
| JP | A-2002-523008 | | 7/2002 |
| JP | 2003-088191 | A | 3/2003 |
| JP | A-2004-15936 | | 1/2004 |
| JP | 2009-183087 | A | 8/2009 |
| JP | 2012-125105 | A | 6/2012 |
| WO | WO 00/08747 | A1 | 2/2000 |

* cited by examiner

*Primary Examiner* — Daniel Cavallari
(74) *Attorney, Agent, or Firm* — Oliff PLC

(57) ABSTRACT

An on-vehicle generator includes a field winding, an armature winding, a bridge circuit having MOS transistors, a rotation detecting circuit that detects a rotational state based on the phase voltage of the armature winding, an excitation current controlling circuit to control the output voltage to be a regulation voltage while rotation of the rotor is detected, two overvoltage detecting circuits each detecting overvoltage when the output voltage exceeds a threshold voltage, a bridge control circuit that ON-OFF controls the MOS transistors while the overvoltage is not detected and enables the MOS transistors to be continuously ON when detecting overvoltage, and a rotation output holding circuit that outputs a signal holding the rotational state of the rotation detecting circuit when detecting overvoltage and outputs the signal to the excitation current controlling circuit.

9 Claims, 3 Drawing Sheets

ON-VEHICLE GENERATOR PROVIDED WITH OVERVOLTAGE DETECTING CIRCUIT

CROSS REFERENCE TO RELATED APPLICATION

This application is based on and claims the benefit of priority from earlier Japanese Patent Application No. 2011-92172 filed on Apr. 18, 2011, the description of which is incorporated herein by reference.

BACKGROUND

1. Technical Field

The present application relates to generators, and more particularly to a generator mounted on a vehicle such as passenger cars and trucks.

2. Description of the Related Art

The generator mounted on a vehicle (i.e., on-vehicle generator) supplies power to a battery to be charged or supplies necessary power to various electrical loads via a charge line which is connected to the output terminal of the on-vehicle generator. While the generator is generating power, when the output terminal or the battery terminal is disconnected unexpectedly, transient high voltage spikes i.e., load dump occurs. The load dump voltage may exceed 100 volts depending on load current. Since such high voltage spikes may cause damage to the electrical load or damage of devices used in the generator, a countermeasure is required to prevent this phenomenon.

In this regard, Japanese Patent Application Laid-Open Publication No. 1997-219938 discloses an on-vehicle generator in which occurrence of high voltage spikes is suppressed by a protecting operation. The protecting operation is such that low-side devices of a bridge circuit of the generator are configured by MOS transistors and the MOS transistors are controlled to be turned ON when the output voltage of the generator exceeds a predetermined reference voltage due to occurrence of the load dump, thereby suppressing occurrence of the high voltage spikes.

In the on-vehicle generator disclosed in the above-described patent document, when the respective MOS transistors as low-side devices (low-side MOS transistors) of the bridge circuit are controlled to be turned ON whereby the output voltage decreases to be within the predetermined reference voltage, the respective MOS transistors turn OFF again. Therefore, normal rectification by the bridge circuit is resumed.

In the on-vehicle generator disclosed in the above-described patent document, the low-side MOS transistors turn ON and OFF at a switching rate faster than the period of rectification when the phase voltage exceeds the predetermined reference voltage. As a result, it needs a longer time to consume the charge energy of the gate pulse voltage so that occurrence of the high voltage spike cannot be terminated immediately.

For terminating the high voltage spike in a short period of time, it is considered that the low-side MOS transistors can be kept in an ON state when the phase voltage of the on-vehicle generator exceeds the predetermined reference voltage. However, in some of the on-vehicle power generation control apparatus (regulators), control operation starts when detecting start of power generation triggered by a switching frequency corresponding to the phase voltage exceeding a predetermined threshold voltage, and alerts to notify occurrence of abnormality when starting of the power generation cannot be detected.

Therefore, if the period for the low-side MOS transistor being OFF becomes longer, the phase voltage continues to be lower than the predetermined threshold voltage even if the on-vehicle generator is rotating. Hence, a stop-condition of the power generation may be erroneously detected.

In this case, assuming the on-vehicle generator supplies initial excitation current to the field windings in order to start the power generation, redundant current would flow through the field windings and phase current flowing through the low-side MOS transistor would increase. Considering the efficiency of the power generation and the heat dissipation, it is not preferable to control the on-vehicle generator in such a way. Moreover, when a stop-condition of the power generation is erroneously detected so that the on-vehicle generator mistakenly to performs an alert operation, the driver of the vehicle will be confused and wrong signals may be transmitted to an external devices.

SUMMARY

An embodiment provides an on-vehicle generator that promptly terminates high voltage spikes when a load dump occurs and prevents a malfunction due to a stop-condition of the power generation being erroneously detected.

According to the embodiment, An on-vehicle generator electrically connected to a battery and an electrical load mounted on a vehicle, supplying power to the electrical load and charging power to the battery, includes: a rotor having a field pole; a field winding that magnetizes the field pole of the rotor; a stator having an armature winding that generates an AC voltage by a rotating field generated by the field pole, the armature winding including a plurality of windings each generates a phase voltage; a bridge circuit capable of rectifying the AC voltage generated by the armature winding into an output voltage, in which a switching element being connected between an output end of the armature winding and either positive or negative terminal of the battery is included therein and the switching element is controlled to be ON and OFF thereby rectifying the AC voltage; a rotation detecting circuit that detects a rotational state expressing whether or not the rotor rotates, based on the phase voltage and outputs a detection signal representing the rotational state; a first control circuit that controls a current flowing through the field winding to maintain the output voltage to be a first voltage, when the rotation detecting circuit detects rotation of the rotor; an overvoltage detecting circuit that detects an overvoltage of the on-vehicle generator when the output voltage of the bridge circuit exceeds a second voltage that is higher than the first voltage; a second control circuit that controls the switching element to be ON and OFF when the overvoltage is not detected by the overvoltage detecting circuit and controls the switching element to be continuously ON when the overvoltage is detected by the overvoltage detecting circuit; an output enabling circuit that enables the detection signal of the rotation detecting circuit to be outputted to the first control circuit when the overvoltage is not detected by the overvoltage detecting circuit; and an output holding circuit that outputs a control signal to the first control circuit when the overvoltage is detected by the overvoltage detecting circuit, in which the control signal holds the rotational state which has been inputted to the first circuit, when the overvoltage is detected by the overvoltage detecting circuit.

The second control circuit turns the switching elements to be continuously ON so that the high voltage spikes due to the load dump can be promptly terminated. In addition, the switching element is turned ON so that the rotation of the rotor cannot be detected based on the phase voltage of the armature winding. However, even in this case, since the rotational state can be maintained when the overvoltage occurs, mis-detection of a power-generation-stop condition caused by erroneously detecting a rotation-stop despite the rotor being rotated, does not occur. Accordingly, malfunction such as supplying initial excitation current triggered by the miss-detection can be avoided.

The above-described output holding circuit preferably holds the rotational state for a predetermined period. Therefore, occurrence of a malfunction can be reliably avoided until the predetermined period elapses after the overvoltage occurs.

The above-described predetermined period is preferably set to be a period required for canceling the overvoltage. Accordingly, a malfunction can be reliably avoided during the period required for canceling the overvoltage after the overvoltage occurs.

Moreover, the overvoltage detecting circuit preferably maintains the overvoltage until the output voltage of the bridge circuit falls below a third voltage which is higher than the first voltage and lower than the second voltage after the overvoltage detecting circuit detects the overvoltage when the output voltage of the bridge circuit exceeds the second voltage. According to this feature, the operation of the overvoltage detection circuit can be stabilized even if the voltage generated by the armature winding fluctuates around the second voltage.

Further, the on-vehicle generator preferably includes a communication circuit that outputs a signal to an external device, the signal representing the rotational state of whether or not the rotor is rotating in response to the output of the output enabling circuit and the output holding circuit. Accordingly, even when the rotation of the rotor cannot be detected based on the phase voltage of the armature winding due to occurrence of the overvoltage, a signal representing the rotational state (rotational state before the overvoltage occurred) can be continuously transmitted to the external device.

The overvoltage detecting circuit includes a first overvoltage detecting unit that detects an overvoltage for the second control circuit and a second overvoltage detecting unit that detects an overvoltage for the output enabling/holding circuits, the first and second overvoltage detecting units detecting the overvoltage individually. The second voltage used for the first and second overvoltage detecting circuits is preferably set to be the same value. According to this configuration, if one of these two overvoltage detecting circuits fails, the on-vehicle generator operates continuously by using the detection result by the other overvoltage detecting circuit.

The above-described overvoltage detecting circuit preferably includes either a first overvoltage detecting circuit that detects an overvoltage for the second control circuit or a second overvoltage detecting circuit that detects an overvoltage for the output enabling/holding circuits. The second control circuit and the output enabling/holding circuits preferably use a result of the detection detected by either the first or second overvoltage detecting circuit. Accordingly, the configuration can be simplified whereby cost reduction can be achieved.

DETAILED DESCRIPTION OF THE PREFERRED EMBODIMENT

With reference to the accompanying drawings, hereinafter is described an on-vehicle generator according to an embodiment of the present application.

Figure 1:
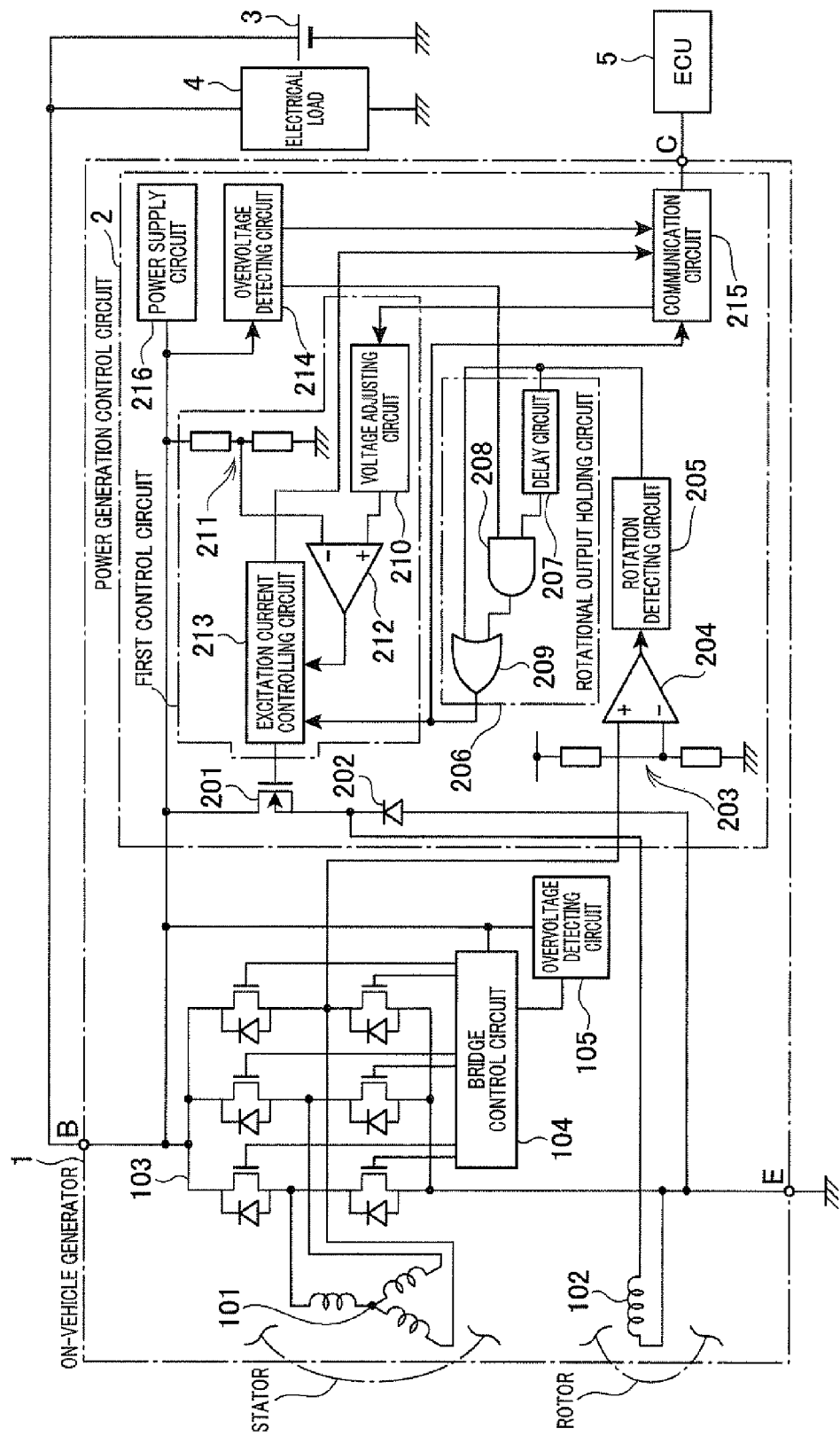
FIG. 1 is a block diagram showing a configuration of an on-vehicle generator according to an embodiment of the present application.

FIG. 1 is a block diagram showing a configuration of an on-vehicle generator according to an embodiment. As shown in FIG. 1, the on-vehicle generator 1 according to the embodiment includes an armature winding 101, a field winding 102, a bridge circuit 103, a bridge control circuit 104, an overvoltage detecting circuit 105 and a power generation control circuit 2. The on-vehicle generator 1 is driven by an engine via a belt and a pulley. The field winding 102 is energized to generate magnetic field. The field winding 102 is wound around a field pole (not shown) to constitute a rotor (102) and magnetizes the field pole of the rotor. The armature winding 101 is a multi phase winding (e.g. three phase windings including U-phase, V-phase and W-phase) and wound around an armature core to constitute an armature (stator).

The armature winding 101 generates electromotive force (alternating-current (AC) voltage) by the rotating field generated by the field winding 102. The AC voltage induced at the armature winding 101 is applied to the bridge circuit 103. The bridge circuit 103 is three-phase bridge circuit of which the upper arm (high-side) element and the lower arm (low-side) element are configured by MOS transistors as switching elements. The bridge circuit performs three-phase-full-wave rectification of the AC voltage induced at the armature winding 101. Each of the switching elements is connected between the output end of each winding (among U-phase, V-phase and W-phase windings) and either the positive or negative terminal of the battery 3. The output voltage of the bridge circuit 103 is outputted externally as an output of the on-vehicle generator 1 and supplied to a battery 3 or an electrical load 4.

The bridge control circuit 104 controls two MOS transistors each corresponding to the upper arm and the lower arm in the respective three-phases U, V, W to be ON and OFF alternately and controls each of the three-phases to be shifted by 120 degree from each other. Therefore, three-phase-full-wave rectification is performed by the bridge circuit 103. For example, regarding three MOS transistors connected to the positive terminal of the battery 3, the bridge control circuit 104 controls the MOS transistors to be turned ON at a timing in which voltage appears at end portion of the phase winding corresponding to each of the MOS transistors becomes higher than the voltage at the positive terminal of the battery 3. Also, regarding three MOS transistors connected to the negative terminal of the battery 3, the bridge control circuit 104 controls the MOS transistors to be turned ON when the voltage at end portions of the phase windings (corresponding to each of the MOS transistors) becomes lower than the voltage at the negative terminal of the battery 3.

The overvoltage detecting circuit 105 detects an overvoltage of the on-vehicle generator 1 based on output voltage of the bridge circuit 103. When the overvoltage detecting circuit 105 detects an overvoltage, the bridge control circuit 104 performs a countermeasure against the load dump such that three low-side MOS transistors of the bridge circuit 103 are controlled to be continuously turned ON. The above-described overvoltage occurs when the charge-line happens to be removed from the output terminal of the on-vehicle generator 1 or the positive terminal of the battery 4. When the overvoltage occurs, by controlling three MOS transistors to be simultaneously ON and keep ON state continuously, energy of the armature winding 101 can be consumed such that the current of the armature winding 101 is switched to the ground terminal E connected to the low-side terminal of the on-vehicle generator 1.

The output (i.e., voltage, current) of the on-vehicle generator 1 varies depending on a rotational rate of the rotor and an amount of the field current that flows through the field winding 102 and the amount of the field current is controlled by the power generation control circuit 2. The power generation control circuit 2 controls the field current that flows through the field winding 102 so as to maintain a voltage (output voltage of the bridge circuit 103) at the output terminal (B terminal) of the on-vehicle generator 1 to be a regulation voltage V1, while the rotor is rotating after starting of the on-vehicle generator 1. Meanwhile, when the rotor is not rotating, the power generation control circuit 2 supplies a predetermined initial excitation current (i.e., excitation current necessary for starting power generation, e.g. approximately 2 Amp.) to the field winding 102.

Next, detail configuration of the power generation control circuit 2 and the operation thereof are described as follows. As shown in FIG. 1, the power generation control circuit 2 includes a MOSFET 201, a freewheeling diode 202, voltage dividers 203 and 211, a voltage comparator 204 and 212, a rotation detecting circuit 205, a rotational output holding circuit 206, a voltage adjusting circuit 210, an excitation current controlling circuit 213, an overvoltage detecting circuit 214, a communication circuit 215 and a power supply circuit 216.

The MOSFET 201 is connected in series to the field winding 102. The excitation current flows through the field winding 102 when the MOSFET 201 is turned ON. The freewheeling diode 202 is connected in parallel to the field winding 102 and enables the excitation current to be returned when the MOSFET 201 is turned OFF.

The voltage divider 203 is configured by a plurality of resistors. The voltage divider 203 divides operation voltage supplied by the power supply circuit 216 so as to generate a reference voltage necessary for detecting the rotation of the generator. As to the voltage comparator 204, the reference voltage generated by the voltage divider 203 is connected to the negative terminal of the voltage comparator 204 and a phase voltage at any one of windings of the armature winding 101 is connected to the positive terminal of the voltage comparator 204.

The voltage comparator 204 compares the phase voltage with the reference voltage and outputs a high level signal when the phase voltage is higher than the reference voltage and outputs a low level signal when the phase voltage is lower than the reference voltage. Specifically, the voltage comparator 204 outputs a signal of which signal level alternates between high and low at a period corresponding to the rotational rate, when the amplitude of the phase voltage exceeds a predetermined reference value after the rotor starts rotation. Otherwise, when the rotation is stopped, the voltage comparator 204 outputs a signal being fixed at low level.

The rotation detecting circuit 205 detects whether or not the rotor rotates based on the output signal of the voltage comparator 204 and outputs a detection signal representing the result of the detection (i.e., rotational state). Specifically, when the voltage comparator 204 outputs a signal of which the signal level alternates between high and low, the rotation detecting circuit 205 determines that the rotor is rotating and outputs a high level signal as the detection signal, and when the voltage comparator 204 outputs a signal of which signal level is fixed low, the rotation detecting circuit 205 determines that the rotor is stopped and outputs a low level signal as the detection signal.

The overvoltage detecting circuit 214 detects an overvoltage based on the output voltage of the bridge circuit 103. The overvoltage detecting circuit 214 outputs a high level signal when detecting an overvoltage, and outputs a low level signal when overvoltage is not detected. A threshold voltage V2 is used for detecting overvoltage. The threshold V2 is set to be higher than the regulation voltage V1. For example, the regulation voltage V1 is set as 14 volts, and the threshold voltage V2 is set as 24 volts. Further, when the threshold voltage V2 and the output voltage of the bridge circuit 103 fluctuates around 24 volts, detection and release of the overvoltage is repeated. Hence, after an overvoltage is detected when the output voltage of the bridge circuit 103 rises to exceed the threshold voltage V2, the overvoltage state can be maintained until the output voltage of the bridge circuit 103 falls below a threshold voltage V3 which is higher than the regulation voltage V1 and lower than the threshold voltage V2. In other words, the overvoltage detecting circuit 214 cancels the overvoltage when the output voltage of the bridge circuit is less than the threshold voltage V3. As a result, the operation of the overvoltage detecting circuit 214 can be stabilized even if the output voltage of the bridge circuit 103 fluctuates around the threshold voltage V2.

It is noted that the regulation voltage V1 corresponds to the first voltage, the threshold voltage V2 corresponds to the second voltage V2 and the threshold voltage V3 corresponds to the third voltage. Moreover, as to the threshold voltages V2 and V3 used for detecting an overvoltage by the overvoltage detecting circuit 214, the same value of the threshold voltages V2 and V3 are used for the overvoltage detecting circuit 105 to detect overvoltage.

The rotational output holding circuit 206 is configured to output a detection signal of the rotation detecting circuit 205 to the excitation current controlling circuit 213 while an overvoltage has not been detected by the overvoltage detecting circuit 214. Also, when an overvoltage is detected by the overvoltage detecting circuit 214, at that point (or immediately before), the rotational output holding circuit 206 outputs a control signal in order to hold the detection signal (i.e., rotational state) of the rotation detecting circuit 205 being inputted to the excitation current controlling circuit 213, to the excitation current controlling circuit 213.

The rotational output holding circuit 206 includes a delay circuit 207, an AND circuit 208 and an OR circuit 209. The delay circuit 207 delays the signal outputted by the rotation detecting circuit 205 by a predetermined period and outputs the delayed signal. The predetermined period (i.e., delayed-period) is a period for holding the output signal of the rotation detecting circuit 205 (rotational state) in the rotational output holding circuit 206. The delayed-period is preferably set longer than a period required for canceling the overvoltage (this period can be determined through experiments based on measurement assuming various conditions of the load dumps). The output signal of the delay circuit 207 and the output signal of the overvoltage detecting circuit 214 are inputted to the AND circuit 208.

The AND circuit 208 produces a logical AND for these signals and outputs the result. When the output signal of the overvoltage detecting circuit 214 becomes high level, the AND circuit 208 outputs the delayed signal (i.e., delayed-output of the rotation detecting circuit 205 which is delayed by the delay circuit 207). As the input signals, the output signal of the AND circuit 208 and the output signal of the rotation detecting circuit 205 are connected to the OR circuit 209. The OR circuit 209 produces logical OR for these signals and outputs the result. When an overvoltage is not detected, the AND circuit 208 holds its output to be low level, the OR circuit 209 outputs the output signal from the rotation detecting circuit 209 directly. Meanwhile, when an overvoltage occurs, the OR circuit 209 outputs a signal being logical ORed between the output signal of the rotation detecting circuit 205 and the output signal of the AND circuit 208 (i.e., delayed-output of the rotation detecting circuit 205 which is delayed by the delay circuit 207).

The voltage adjusting circuit 210 generates voltage corresponding to the regulation voltage V1. The voltage divider 211 is configured by a plurality of resistors and divides the output voltage (output voltage of the bridge circuit 103) of the on-vehicle generator 1 and outputs voltage representing the generated voltage. At the negative terminal of the voltage comparator 212, the voltage divided by the voltage divider 211 is inputted, and at the positive terminal of the voltage comparator 212, the voltage corresponding to the regulation voltage V1 is inputted. The voltage comparator 212 outputs a high level signal when the voltage representing the generated voltage is lower than the regulation voltage V1.

The excitation current controlling circuit 213 has input signals including the output signal of the voltage comparator 212 and the output signal of the OR circuit 209 in the rotational output holding circuit 206. The excitation current controlling circuit 213 controls the MOSFET 201 to be ON and OFF based on these input signals so as to control the field current flowing through the field winding 102, whereby the output voltage of the on-vehicle generator 1 (output voltage of the bridge circuit 103) is maintained at the regulation voltage V1. Specifically, the output voltage of the on-vehicle generator is controlled to be the regulation voltage V1 when the rotor is rotating (while the rotational output holding circuit 206 is outputting high level signal).

When the output signal of the voltage comparator 212 becomes high level (the output voltage is lower than the regulation voltage V1), the excitation current controlling circuit 213 controls the MOSFET 201 to be ON and OFF with an appropriate drive-duty (i.e., duty ratio) in order to increase the output voltage. On the contrary, when the output signal of the voltage comparator 212 becomes low level (the output voltage is higher than the regulation voltage), the excitation current controlling circuit 213 controls the MOSFET 201 to be ON and OFF with an appropriate drive-duty in order to decrease the output voltage. Further, when the rotor is not rotating (while the rotational output holding circuit 206 outputs low level signal), the excitation current controlling circuit 213 controls the MOSFET 201 to be ON and OFF with an appropriate drive-duty in order to supply a predetermined initial excitation current to the field winding 102.

The communication circuit 215 transmits/receives various pieces of information to/from an external device such as an ECU (electronic control unit) 5 via a communication terminal C. The ECU is, for example, adapted to control an internal combustion engine. The ECU 5 transmits information including the regulation voltage V1. The communication circuit 215 receives this information and outputs a signal corresponding to the regulation voltage V1 to the voltage adjusting circuit 210. The voltage adjusting circuit 210 generates the regulation voltage V1 based on the signal corresponding to the regulation voltage V1. As a result, the regulation voltage V1 can be any value in response to a command transmitted by the ECU 5.

The communication circuit 215 receives signals from the rotational output holding circuit 206, the excitation current controlling circuit 213 and overvoltage detecting circuit 214. The signal outputted from the rotational output holding circuit 206 (output signal from the OR circuit 209) indicates a rotational state, i.e., rotation or no-rotation. The signal outputted from the excitation current controlling circuit 213 indicates the drive-duty of the MOSFET 201. The signal outputted from the overvoltage detecting circuit 214 indicates whether or not overvoltage is detected (whether or not overvoltage state exists). The communication circuit 215 outputs signals towards ECU 5 such that the communication circuit 215 outputs a signal indicating the drive-duty of the MOSFET 201 when a normal rotation is performed (during power generation), outputs an overvoltage alert signal when the normal rotation is performed and an overvoltage state is detected, and outputs a rotation stop alert signal while the rotation is stopped. The power supply circuit 216 generates an operating voltage necessary for operating each circuit blocks in the power generation control circuit 2.

The above-described excitation current controlling circuit 213, the drive-duty of the MOSFET 201, the voltage divider 211 and the voltage comparator 212 corresponds to the first control circuit, the bridge control circuit 104 corresponds to the second control circuit, the overvoltage detecting circuit 105 corresponds to the first overvoltage detecting circuit, the overvoltage detecting circuit 214 corresponds to the second overvoltage detecting circuit and the rotational output holding circuit 206 corresponds to the output enabling circuit and the output holding circuit.

The on-vehicle generator 1 according to the embodiment has above-described configuration. Next, operation of the on-vehicle generator 1 is described as follows.

(Operation when Rotation is Stopped)

Figure 2:
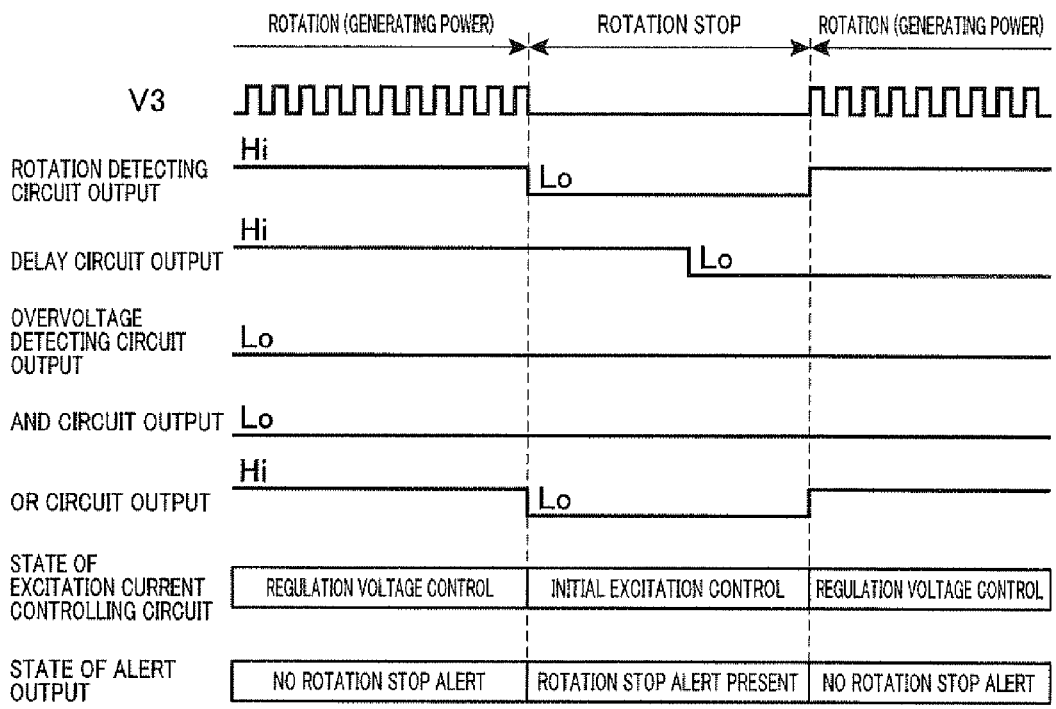
FIG. 2 is a timing diagram showing an operation of an excitation current controlling circuit and a state of a rotation stop alert when the rotation of the generator is stopped.

FIG. 2 is a timing diagram showing an operation of the excitation current controlling circuit 213 and a state of the rotation stop alert signal when the rotation of the generator is stopped. In FIG. 2 (FIG. 5 which is described later is similar to FIG. 2), V3 shows a phase voltage at one phase (e.g. W-phase) of the armature winding 101, the rotation-detecting-circuit output shows an output signal of the rotation detecting circuit 205, delay circuit output shows an output signal of the delay circuit 207, the overvoltage-detecting-circuit output shows an output signal of the overvoltage detecting circuit 214, the AND circuit output shows an output signal of the AND circuit 208 and the OR circuit output shows an output signal of the OR circuit 209. The state of the excitation current control circuit shows contents of the controlling by the excitation current control circuit. The regulation voltage control shows an ON/OFF control of the MOSFET 201 in order to maintain the output voltage of the on-vehicle generator 1 to be the regulation voltage V1. The initial excitation control shows an ON and OFF control of the MOSFET 201 with a low-constant drive-duty. The state of the alert output shows whether or not a state of the rotation stop alert being transmitted to the ECU 5 from the communication circuit 215 is active.

While the rotor is rotating, the rotation detecting circuit 205 detects a rotation of the rotor based on a periodical change of the output signal of the voltage comparator 204 which is synchronized to the phase voltage V3 and outputs high level signal. Since the high level signal is transmitted to the excitation current controlling circuit 213 via the OR circuit 209, the excitation current controlling circuit 213 controls the output voltage of the on-vehicle generator 1 to be the regulation voltage V1 while the rotor is rotating. The high-level output signal of the OR circuit 209 is transmitted to the communication circuit 215 as well so that the communication circuit 215 does not output the rotation stop alert signal when receiving the high level signal.

Meanwhile, when the rotor changes the rotational state to the no-rotation state from the rotation state, the output signal of the rotation detecting circuit 205 immediately changes to low level from high level. Considering an overvoltage is not detected, the output signal of the overvoltage detecting circuit stays low level and the output signal of the AND circuit 208 stays low level as well. Therefore, when the output signal of the rotation detecting circuit 205 changes to low level from high level, at the same time, the output signal of the OR circuit 209 changes to low level from high level. As a result, the excitation current controlling circuit 213 starts to perform the initial excitation control in which the ON-OFF control of the MOSFET 201 is performed with a low-constant drive-duty. Since the low level output signal of the OR circuit 209 is transmitted to the communication circuit 215, the communication circuit 215 transmits the rotation stop alert signal to the ECU 5 when the low level signal is received by the communication circuit 215.

(Operation when an Overvoltage Occurs)

While the on-vehicle generator 1 is generating power normally (normal operation when the rotor is rotating), when a charge line connected to the output terminal of the on-vehicle generator 1 is disconnected unexpectedly so that current being supplied to the battery 3 or the electrical load 4 are cutoff suddenly, transient high voltage spikes, namely, load dump occurs at the output terminal of the on-vehicle generator 1.

Figure 3:
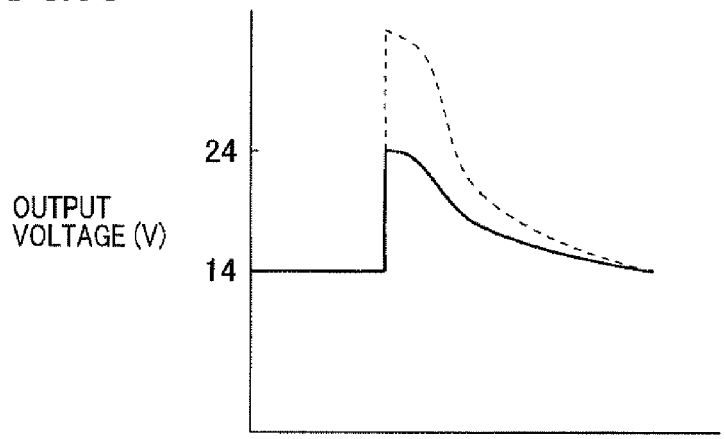
FIG. 3 is a diagram showing an output voltage change of the on-vehicle generator when the load dump is occurred.

FIG. 3 is a diagram showing an output voltage change of he on-vehicle generator 1 when the load dump is occurred. When in the normal operation, the output voltage of the on-vehicle generator 1 is maintained to be the regulation voltage V1 (14 volts). The output voltage of the on-vehicle generator 1 rises rapidly when the load dump occurs. In FIG. 3, a dotted line represents an output voltage change when a countermeasure against the load dump is not performed. According to the embodiment, high voltage spikes when the load dump occurs is detected by the overvoltage detecting circuit 214 and the bridge circuit 104 performs the countermeasure against the load dump whereby the load dump is suppressed (see solid line as shown in FIG. 3. Therefore, devices used for the power generation control circuit 2 or the bridge circuit 103 are protected from a fault caused by the overvoltage.

Figure 4:
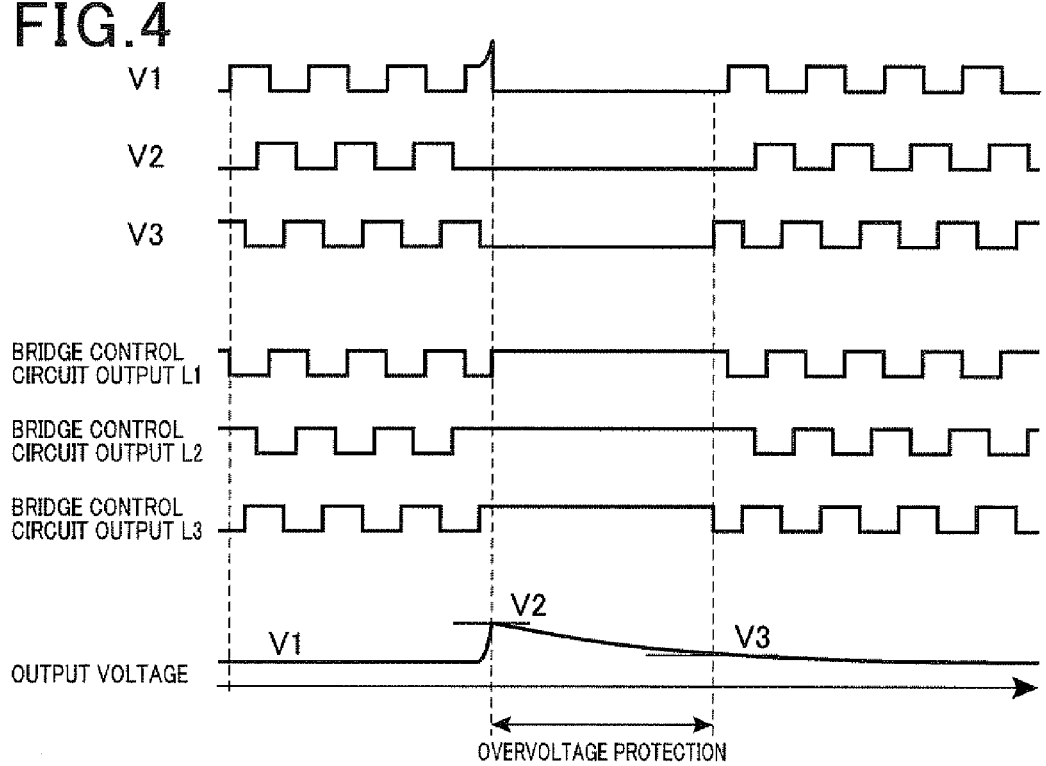
FIG. 4 is a timing diagram showing an operation of an over voltage protection performed by a bridge circuit when the load dump is occurred.

FIG. 4 is a timing diagram showing an operation of an over voltage protection performed by the bridge circuit 104 when the load dump is occurred.

As shown in FIG. 4, V1 to V3 represents phase voltages of the respective phases of the armature winding 101, the bridge control circuit output L1 to L3 represents signals inputted to the respective gate terminals of the three MOS transistors as a lower arm element. It is noted that V1 corresponds to L1, V2 corresponds to L2 and V3 corresponds to L3. The signals are inputted to the respective gate terminals by the bridge control circuit 104.

When the load dump occurs so that the output voltage increases rapidly and the output voltage of the on-vehicle generator 1 exceeds the threshold voltage V2 (24 volts), the bridge control circuit 104 changes the operation mode to the overvoltage protection. Specifically, the bridge control circuit 104 outputs signals that turn the respective MOS transistors simultaneously and continuously ON instead of outputting the signals that turn the respective MOS transistors of the lower arm ON and OFF. At this time, the MOS transistors of the upper arm controlled to be simultaneously and continuously OFF.

Accordingly, the electromotive force generated at the armature winding 101 is consumed via the ground terminal E so that the output voltage can be decreased promptly from V2. When the output voltage is decreased to V3, the overvoltage protection is terminated and the normal operation is resumed.

Figure 5:
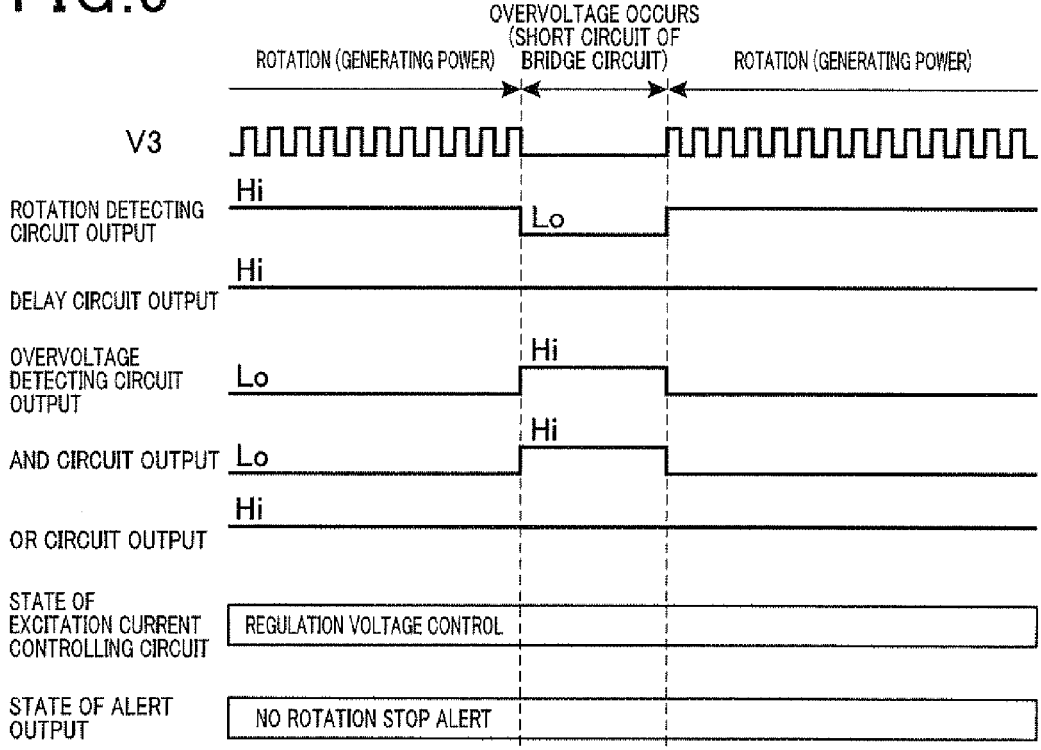
FIG. 5 is a timing diagram showing an operation of an excitation current controlling circuit and a state of a rotation stop alert signal when the load dump is occurred.

FIG. 5 is a timing diagram showing an operation of the excitation current controlling circuit 213 and a state of the rotation stop alert signal when the load dump is occurred.

When a load dump occurs, the bridge control circuit 104 controls the respective MOS transistors of the lower arm in the bridge circuit 103 to be OFF, whereby the output signal of the voltage comparator 204 which is synchronized to the phase voltage V3 is fixed to be low level. Therefore, the output signal of the rotation detecting circuit 205 changes to low level from high level. However, the output of the delay circuit 207 is not changed to low level immediately and stays high level for a predetermined period. The output signal of the overvoltage detecting circuit 214 becomes high level when the load dump occurs. Therefore, the AND circuit 208 where each of the output signals of the delay circuit 207 and the overvoltage detecting circuit 214 are inputted, outputs high level signal which is inputted to the excitation current controlling circuit 213 via the OR circuit 209. Hence, even though a rotation of the rotor is not detected by the rotation detecting circuit 205, the excitation current controlling circuit 213 controls the output voltage of the on-vehicle generator 1 to be the regulation voltage V1. The high level signal of the OR circuit 209 is inputted to the communication circuit 215 so that the communication circuit 215 does not transmit the rotation stop alert signal towards an ECU.

When the high voltage spike due to load dump disappears in a predetermined period, the bridge control circuit 104 resumes a normal operation (control) of the bridge circuit 103. Therefore, the output signal of the rotation detecting circuit 205 turns to high level from low level and inputted to the excitation current controlling circuit 213 via the OR circuit 209. As a result, the excitation current controlling circuit 213 continues to control the output voltage of the on-vehicle generator 1 to be the regulation voltage V1.

Thus, in the on-vehicle generator 1 according to the embodiment, the bridge circuit 104 controls the respective MOS transistors of the lower arm in the bridge circuit 103 to be continuously ON whereby the high voltage spike due to load dump can be promptly terminated. The respective MOS transistors are continuously turned ON so that rotation detecting circuit 205 cannot detect the rotation based on the phase voltage of the armature winding 101. However, even in this case, since the rotational state when the overvoltage is detected can be held by the rotational output holding circuit 206, a miss-detection of a power-generation-stop condition caused by erroneously detecting a rotation-stop despite the rotor being rotated, is not occurred. Accordingly, malfunction such as supplying initial excitation current triggered by the mis-detection can be avoided.

Moreover, since the rotational output holding circuit 206 holds the rotational state for a predetermined period when the overvoltage is occurred, occurrence of malfunction during a period from a time when the overvoltage occurs to a time when a predetermine time is elapsed can be reliably avoided. The predetermined period is set to be a period necessary for an overvoltage event to be terminated whereby occurrence of malfunction during a period from a time when the overvoltage occurs to a time when the overvoltage is terminated can be reliably avoided.

Further, the overvoltage detecting circuit 214 continuously detects an overvoltage during a period when the output voltage of the on-vehicle generator 1 (output voltage of the bridge circuit 103) exceeds the threshold voltage V2 until the output voltage of the on-vehicle generator 1 decreases below the threshold voltage V3 which is lower than the threshold voltage V2 and higher than the regulation voltage V1. Thus, a hysteresis voltage is used to detect the overvoltage. Therefore, the overvoltage detection can be stabilized even when the voltage generated at the armature winding 101 changes around the threshold voltage V2.

The signal indicating the rotational state, i.e., rotation or no-rotation in response to the output signal of the rotational output holding circuit 206 is transmitted to the external ECU via the communication circuit 215. Accordingly, even when detection of the rotation based on the phase voltage of the armature winding 101 cannot be made due to occurrence of an overvoltage, the signal indicating the rotational state (rotational state before the overvoltage is occurred) can be continuously transmitted to the ECU 5.

The overvoltage detecting circuit 105 that detects an overvoltage, assigned for the bridge control circuit 104 and the overvoltage detecting circuit 214 that detects an overvoltage, assigned for the rotational output holding circuit 206, are provided individually. The threshold voltages V2 and V3 used for detecting the overvoltage in each of the overvoltage detecting circuits 105 and 214 are set to be the same value. Hence, if one of these two overvoltage detecting circuits 105 and 214 fails, the on-vehicle generator 1 can operate continuously by using the detection result by the other overvoltage detecting circuit.

The present disclosure is not limited to the above-described embodiment, however, various modification can be made without departing from the scope of the present disclosure. For example, according to the above-described embodiment, the overvoltage detecting circuits 105 and the 214 are provided individually. However, either one of these overvoltage detecting circuits can be provided to detect an overvoltage and the detection result may be used for both bridge circuit 104 and the rotational output holding circuit 206. As a result, the configuration of the on-vehicle generator can be simplified so is that a cost reduction can be achieved.

Moreover, according to the above-described embodiment, the overvoltage detecting circuit 105 is disposed outside the bridge control circuit 104, however, the overvoltage detecting circuit 105 can be integrated to the bridge control circuit 104.

According to the above-described embodiment, both of the upper arm and the lower arm are configured by the MOS transistors, however, both arms are configured by switching elements other than the MOS transistors. Focusing on suppressing the high voltage spikes due to occurrence of the load dump, the upper arm elements can be configured by rectifying devices, e.g. diodes, other than switching elements.

According to the above-described embodiment, the rotational output holding circuit 206 is configured by a logic circuit, however, the function of the rotational output holding circuit 206 can be configured by software executed by a microprocessor.

What is claimed is:

1. An on-vehicle generator electrically connected to a battery and an electrical load mounted on a vehicle, supplying power to the electrical load and charging power to the battery, comprising:
   a rotor having a field pole;
   a field winding that magnetizes the field pole of the rotor;
   a stator having an armature winding that generates an AC voltage by rotating field generated by the field pole, the armature winding including a plurality of windings each generates a phase voltage;
   a bridge circuit capable of rectifying the AC voltage generated by the armature winding into an output voltage, wherein a switching element being connected between an output end of the armature winding and either positive or negative terminal of the battery is included therein and the switching element is controlled to be ON and OFF thereby rectifying the AC voltage;
   a rotation detecting circuit that detects a rotational state whether or not the rotor rotates, based on the phase voltage and outputs a detection signal representing the rotational state;
   a first control circuit that controls a current flowing through the field winding to maintain the output voltage to be a first voltage, when the rotation detecting circuit detects rotation of the rotor;
   an overvoltage detecting circuit that detects an overvoltage state of the on-vehicle generator when the output voltage of the bridge circuit exceeds a second voltage that is higher than the first voltage;
   a second control circuit that controls the switching element to be ON and OFF when the overvoltage state is not detected by the overvoltage detecting circuit and controls the switching element to be continuously ON when the overvoltage state is detected by the overvoltage detecting circuit;
   an output enabling circuit that enables the detection signal of the rotation detecting circuit to be outputted to the first control circuit when the overvoltage state is not detected by the overvoltage detecting circuit; and
   an output holding circuit that outputs a control signal to the first control circuit when the overvoltage state is detected by the overvoltage detecting circuit, wherein the control signal holds the rotational state which has been inputted to the first circuit, when the overvoltage state is detected by the overvoltage detecting circuit.

2. The on-vehicle generator according to claim 1, wherein the output holding circuit holds the rotational state for a predetermined period.

3. The on-vehicle generator according to claim 2, wherein the predetermined period is set to be a period required for canceling the overvoltage state.

4. The on-vehicle generator according to claim 1, wherein the overvoltage detecting circuit maintains the overvoltage state until the output voltage of the bridge circuit falls below a third voltage which is higher than the first voltage and lower than the second voltage after the overvoltage detecting circuit detects the overvoltage state when the output voltage of the bridge circuit exceeds the second voltage.

5. The on-vehicle generator according to claim 2, wherein the overvoltage detecting circuit maintains the overvoltage state until the output voltage of the bridge circuit falls below a third voltage which is higher than the first voltage and lower than the second voltage after the overvoltage detecting circuit detects the overvoltage state when the output voltage of the bridge circuit exceeds the second voltage.

6. The on-vehicle generator according to claim 3, wherein the overvoltage detecting circuit maintains the overvoltage state until the output voltage of the bridge circuit falls below a third voltage which is higher than the first voltage and lower than the second voltage after the overvoltage detecting circuit detects the overvoltage state when the output voltage of the bridge circuit exceeds the second voltage.

7. The on-vehicle generator according to claim 1, further comprising a communication circuit that outputs a signal to an external device, the signal representing the rotational state of whether or not the rotor is rotating in response to the output of the output enabling circuit and the output holding circuit.

8. The on-vehicle generator according to claim 1, wherein the overvoltage detecting circuit includes a first overvoltage detecting circuit that detects an overvoltage state for the second control circuit, and a second overvoltage detecting circuit that detects an overvoltage state for the output enabling circuit and the output holding circuit, the first and second overvoltage detecting circuits detecting the overvoltage state individually, and the second voltage used for the first and second overvoltage detecting circuits having the same value.

9. The on-vehicle generator according to claim 1, wherein the overvoltage detecting circuit includes either a first overvoltage detecting circuit that detects an overvoltage state for the second control circuit or a second overvoltage detecting circuit that detects an overvoltage state for the output enabling circuit and the output holding circuit, the second control circuit, the output enabling circuit and the output holding circuit use a result of the detection detected by either the first or second overvoltage detecting circuit.

* * * * *